(12) United States Patent
Degani et al.

(10) Patent No.: US 9,126,396 B2
(45) Date of Patent: Sep. 8, 2015

(54) INSTANT FILM PRINTER FOR LIGHT EMITTING DISPLAY SCREEN INCORPORATING OPTICAL COLLIMATION LAYER

(71) Applicants: Ismail Degani, Newport Beach, CA (US); Isaac Degani, Huntington Beach, CA (US)

(72) Inventors: Ismail Degani, Newport Beach, CA (US); Isaac Degani, Huntington Beach, CA (US)

(73) Assignee: Pacific Opal LLC, Huntington Beach, CA (US)

( * ) Notice: Subject to any disclaimer, the term of this patent is extended or adjusted under 35 U.S.C. 154(b) by 0 days.

(21) Appl. No.: 14/185,906

(22) Filed: Feb. 20, 2014

(65) Prior Publication Data

US 2015/0138526 A1      May 21, 2015

Related U.S. Application Data

(60) Provisional application No. 61/907,370, filed on Nov. 21, 2013.

(51) Int. Cl.
*B41F 17/00* (2006.01)
*G02B 27/30* (2006.01)

(52) U.S. Cl.
CPC ............... *B41F 17/00* (2013.01); *G02B 27/30* (2013.01)

(58) Field of Classification Search
CPC ................................. B41F 17/00; G02B 27/30
USPC ............................................................ 355/19
See application file for complete search history.

(56) References Cited

U.S. PATENT DOCUMENTS

| 3,843,228 | A | 10/1974 | Yoshiyagawa et al. |
| 4,262,301 | A | 4/1981 | Erlichman |
| 4,937,676 | A | 6/1990 | Finelli et al. |
| 5,715,234 | A | 2/1998 | Stephenson et al. |
| 6,625,395 | B2 | 9/2003 | Kitagawa |
| 6,963,359 | B1 | 11/2005 | Aosaki et al. |
| 7,433,127 | B2 * | 10/2008 | Arai et al. ..................... 359/626 |
| 8,213,082 | B2 | 7/2012 | Gaides et al. |

FOREIGN PATENT DOCUMENTS

WO   WO 2014000817 A1   1/2014

* cited by examiner

*Primary Examiner* — Chia-How Michael Liu

(57) ABSTRACT

Disclosed is a printing device comprising a collimation layer disposed between a display screen and a sheet of instant film. The printing device quickly and compactly prints the display screen contents to the instant film, using a collimation layer that may be embedded in an opaque ribbon and drawn across the instant film. The collimation layer blocks any light not parallel to the normal vector of the display screen, thereby eliminating the need for traditional lenses to focus light. This in turn allows the printing device to yield high resolution photos with very short printing timeframes.

16 Claims, 16 Drawing Sheets

INSTANT FILM PRINTER FOR LIGHT EMITTING DISPLAY SCREEN INCORPORATING OPTICAL COLLIMATION LAYER

CROSS REFERENCE TO RELATED APPLICATION

The present Application is related to Provisional Patent Application entitled "Instant Film Printer Incorporating Optical Collimation Layer," filed 21 Nov. 2013 and assigned filing No. 61/907,370, incorporated herein by reference in its entirety.

FIELD OF THE INVENTION

The present invention relates to a method and apparatus for producing a physical image directly from a light emitting display screen and, in particular, to a method of directly printing onto a sheet of instant film.

BACKGROUND OF THE INVENTION

U.S. Pat. No. 6,963,359 to Fuji Photo Film Co., Ltd (1998) describes an instant printer where a motorized VFPH (vacuum fluorescent print head) traverses an instant film, exposing one pixel at a time. Similar print-head based devices are proposed in U.S. Pat. No. 6,710,796 to Fuji Photo Film Co., Ltd (1998). Marketed products utilizing this technology are FujiFilm's "FinePix PR21" digital camera (1999), and the "FujiFilm Pivi," (2004).

These products all suffer from the same drawbacks. They require pixel data in order to function, necessitating a DRAM chip or similar to store images. They also require microprocessors to read and convert this data into light sequences that can be sent to the VFPH. Furthermore, if they are to print images from an external electronic device such as a Smartphone, they must incorporate a near-field communication mechanism such as Infrared or Bluetooth, or a wired USB cable input. This electronic complexity introduces many issues, including the need for a power source, higher cost, and compatibility barriers with external devices. The aforementioned printers all retail in the $150-$300 range. Aside from their electronic complexity, they are extremely slow because they must print each pixel sequentially. In particular, the Pivi takes nearly 2 minutes to transfer and print a single image.

The "Impossible Instant Lab", created by the Impossible Project (2012) is a patent pending apparatus that prints the contents of an iPhone screen to instant film. This device relies on a traditional method of exposing film using a pinhole and a shutter, which is substantially identical to a standard camera. Consequently, the device is bulky. In its fully expanded state, the printer stands a full seven inches tall. This is because the distance from the iPhone screen to the instant film must be precise in order to prevent optical blurring.

The device is designed to be placed on a flat surface when developing, and therefore is not suited to be operated while a user is in motion. It requires special software to be installed on the target phone in order to work properly, and seven arduous motions are required to complete the printout of a photo. In particular, the user must 1) extend the telescoping tower, 2) launch the iPhone app and start a custom timer, 3) place the iPhone on the apparatus, 4) open the shutter near the lower end of the apparatus, 5) wait for the timer to signal that the film has been exposed, 6) close the shutter, and 7) push a button which starts a motor that ejects the film. This device is also relatively expensive, selling for $299 on the Impossible Project's Website.

Alternatives to instant film printers that are starting to gain market share are Zink or direct thermal based printers. A discussion of various direct thermal color imaging methods is provided in U.S. Pat. No. 6,801,233 to Polaroid Corporation. Commercially available thermal printers marketed under the Zink Brand include the Polaroid Pogo and LG PD221 Pocket Photo printers. While thermal imaging printers are much more compact than the Impossible Instant Lab, they suffer from the same drawbacks as VFPH-based instant film printers. They are slow to print (40 seconds per image), and the print resolution of current models is limited to 150 to 300 DPI. Therefore they are at best recreational or hobby devices, unsuitable for high quality or professional imaging needs.

There have been several concept drawings of how an Instant Film development device may integrate with smartphones, tablets and other devices with visual displays. The "Sophie Concept", published by M. Funamizu (2011) depicts an iPhone fitted with a special case that is capable of printing out a picture. Since this is only a concept drawing, no specific mechanism or method of operation accompanies it. Conceptions such as this abound in various forms on internet blogs and forums since 2011 and earlier. Therefore, it is apparent that equipping a Smartphone or tablet with a professional-quality instant film printer is a highly desirable concept, which has not yet been fully realized in the market.

To summarize, the current state of the art does not disclose an instant film printer which incorporates a thin optical collimation film in order to efficiently, compactly, and effortlessly print the screen contents of any light emitting display. Several devices incorporating slow or clumsy mechanisms to print images exist, however they are all relatively costly and their user experience is clearly lacking.

BRIEF SUMMARY OF THE INVENTION

In one aspect of the present invention, a printing device suitable for printing an image onto instant film comprises: a light emitting display screen for displaying the image to be printed; an undeveloped sheet of instant film; and an optical collimation layer disposed between the light emitting display screen and the sheet of instant film. The optical collimation layer selectively blocks light that is not parallel to the normal vector of the display screen, obviating the need for traditional lenses in the device. The printing device outputs high-resolution physical photos at low cost, and maintains a compact form-factor.

In another aspect of the present invention, an optical collimation layer comprises: a sheet of material having a maximum thickness of about one inch; and an array of substantially parallel optical collimation tunnels disposed in the sheet of material, each optical collimation tunnel extending from one surface of the sheet of material to a second surface of the sheet of material. The opaque walls of the collimation tunnels block divergent light rays that cause image blurring, yielding focused images without requiring space-inefficient lenses.

In still another aspect of the present invention, an instant film printer comprises: an undeveloped sheet of instant film; and an optical collimation layer positioned proximate the sheet of instant film.

In another aspect of the present invention, a method of printing directly from a light emitting display screen, the method comprises the following: providing a sheet of undeveloped instant film and an optical collimation layer. The optical layer may be formed from a sheet of material shaped and sized so as to cover at least a portion of the display screen, the sheet of material containing a plurality of optical collimation tunnels. Each optical collimation tunnel extending from one surface of the sheet of material to the other surface of the sheet of material, the optical collimation layer further having opaque walls between adjacent optical collimation tunnels. The optical collimation layer may be placed between the display screen and the sheet of instant film. The sheet of instant film may be exposed to light emanating from the display screen and passing through the array of optical collimation tunnels. The opaque walls of the collimation tunnels absorb non parallel light rays that enter the material and eliminate the need for traditional lenses.

The additional features and advantages of the disclosed invention are set forth in the detailed description which follows, and will be apparent to those skilled in the art from the description or recognized by practicing the invention as described, together with the claims and appended drawings.

BRIEF DESCRIPTIONS OF THE DRAWINGS

The foregoing aspects, uses, and advantages of the present invention will be more fully appreciated as the same becomes better understood from the following detailed description of the present invention, when viewed in conjunction with the accompanying Figures, in which.

DETAILED DESCRIPTION OF THE INVENTION

Figure 1:
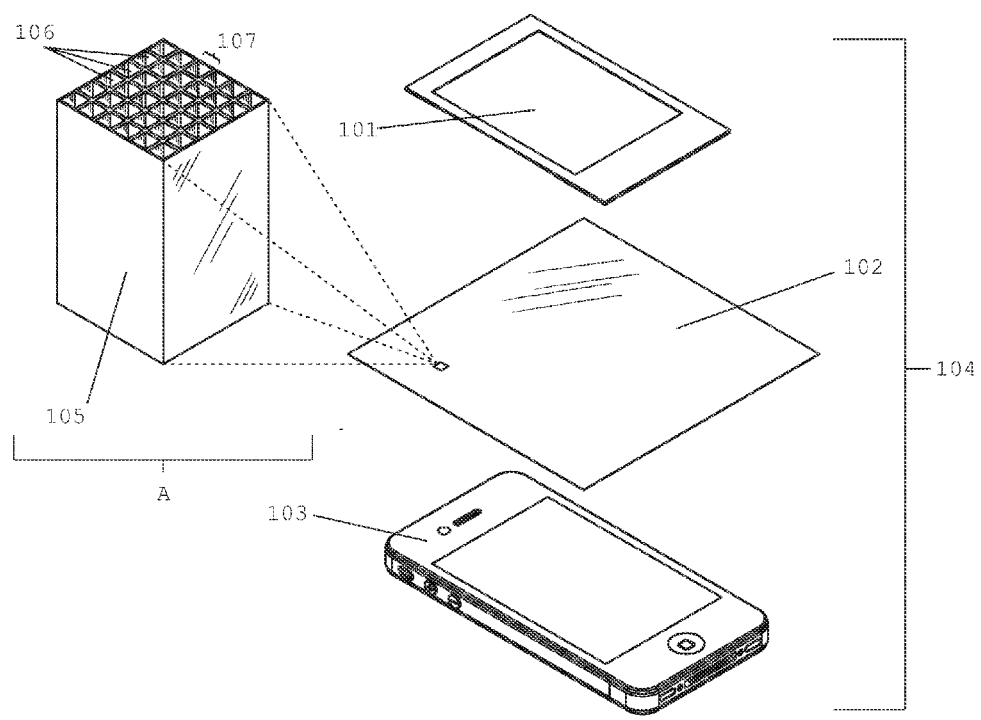
FIG. 1 is a diagrammatical illustration of a system for printing an image onto a sheet of instant film directly from an electronic device with a display screen, including an optical collimation layer disposed between the display screen and the sheet of instant film, in accordance with the present invention.

The following detailed description is of the best currently contemplated modes of carrying out the invention. The description is not to be taken in a limiting sense, but is made merely for the purpose of illustrating the general principles of the invention.

The present invention relates generally to an instant film printer, which incorporates an optical collimation layer to produce physical images directly from any electronic display device such as a CRT, LED, LCD, or Plasma screen. The display device containing the desired image/text is placed flush against the apparatus. Light emanating from the display device passes through the optical collimation layer, which absorbs off-axis light and passes collimated, on-axis parallel light rays (corresponding to a narrow cone of light vectors) onto a sheet of instant film. These collimated light rays are essentially orthogonal to the surface of the display device, and function to imprint a precise copy of the display device screen onto the sheet of instant film.

In effect, this allows consumers to "print" out screenshots from computer tablets, smartphones, or other electronic devices with displays. Disclosed is an entirely new mechanism for exposing instant film without requiring a mechanical shutter or a timed exposure. The disclosed mechanism also achieves a very compact form factor by eliminating any traditional lenses that are designed to focus incoming light. It achieves super-fine theoretical resolutions well beyond 1600 DPI at a fraction of the cost of existing photo printing technology. In practice, the resolution is high enough that individual pixels are not detectable by the naked eye.

The disclosed device allows users to treat instant film as a general purpose print medium. In addition to photos, users may print textual informational such as color business cards, postcards, or shopping lists. The device requires no custom software, releasing the user from needing to save screenshot images of what they wish to print. A user can immediately print out a screenshot from within any application that happens to be in use. The optical collimation layer allows for an extremely small device profile—small enough to fit into a user's pocket along with an electronic device or mobile phone. Finally, the disclosed printer does not necessarily require a power source, making it possible to circumvent the hassle of charging devices and ancillary electronics.

Because the printer directly exposes film using light emitted by the display screen, there is no requirement that the display screen be capable of transmitting digital image information to the printer. This makes the innovative device versatile to an unprecedented degree. For example, any model of electronic tablet or Smartphone can be readily supported by altering the printer's viewport size, leaving all internal mechanisms unchanged. There are no special display requirements. Therefore, essentially any model of phone, tablet, or computer is a viable candidate from which to source images.

FIG. 1 is an isometric exploded view of the core mechanism 104 as functions in the disclosed photo apparatus. The core mechanism 104 comprises three components: (i) a single sheet of undeveloped instant film 101, (ii) a thin optical collimation layer 102, and (iii) a light emitting display screen 103. In the embodiment shown, the thin optical collimation layer 102 comprises a sheet of material shaped and sized so as to cover either, or both of: (i) the entire surface of the light emitting display screen 103 and/or, (ii) the entire surface of the sheet of instant film 101.

In the illustration, the display screen 103 is depicted as the screen of an iPhone for illustration purposes. However, any LCD, CRT, LED, plasma, or other light emitting display surface or component would be equally suitable for practicing the disclosed invention. In addition, it should be understood that there is no requirement that the display screen 103 be a digital or pixelated display, or even a planar surface. For example, analog image surfaces such as transparency paper would be suitable source displays, provided appropriate backlighting. Furthermore, any surface or three-dimensional object that can reflect or scatter light into the optical collimation layer can be imaged onto the instant film 101, in accordance with the disclosed method.

The core mechanism 104 may be placed into a dark environment or into a light-tight enclosure (not shown) accessible by a user such that the user can (i) position the optical collimation layer 102 against the display screen 103, and (ii) position the instant film 101 against the optical collimation layer 102, in essentially total darkness. A shutter mechanism operation may then be performed by powering the display screen 103 on and off to provide a predetermined exposure period of about 250 to 750 milliseconds depending on the display screen's brightness level. Light from the display screen 103 travels through the optical collimation layer 102, as described below, and is absorbed by the silver halide development layer of the instant film 101.

This light absorption action initiates a chemical reaction that effectively imprints or exposes the instant film 101 with the source image data from the display screen 103. It can be appreciated by one skilled in the art that if the instant film 101 were to be placed directly on top of the display screen 103 and exposed to the light emitted from the display screen 103 without the optical collimation layer 102 in place, the resulting image would be blurry and out of focus. This is because overlapping divergent light rays emanating from the display screen 103 would also reach the instant film 101. Advantageously, the optical collimation layer 102 functions to attenuate light rays that were not emitted from the display screen 103 normal to the surface of the display screen 103. That is, non-orthogonal or "off-axis" light does not pass through the optical collimation layer 102 to the surface of the instant film 101. Accordingly, the disclosed method enables a user to obtain high resolution photos.

A zoomed punch-out, denoted as 'A' in the illustration, is an enlarged detail of a microscopic collimation layer cross section 105 of the optical collimation layer 102. Detail A more clearly shows that the micro-structure of the optical collimation layer 102 consists of an array of parallel, relatively long and narrow, optical collimation tunnels 106. The optical collimation tunnels 106 extend from one surface of the optical collimation layer 102 to the other surface of the optical collimation layer 102. The optical collimation tunnels 106 have openings of essentially square-shaped cross sections, therefore, the plurality of optical collimation tunnels 106 may be disposed in a rectangular array. As described above, off-axis light will not be parallel to these tunnels 106, and will eventually impact an opaque wall 201 (shown in FIG. 2) of a tunnel 106. This results in the absorption of these off-axis or divergent light rays. Since transmittal of the off-axis light would produce image blurring on the instant film 101, selectively blocking the off-axis or non-orthogonal light yields a highly advantageous result.

By forcing the light to travel through parallel, long, and relatively narrow optical collimation tunnels 106 extending through the entire thickness of the optical collimation layer 102, a sharp and focused image can be printed very compactly, without any optical lenses required between the light source and the imaging medium. Furthermore, essentially all image pixels in the display screen 103 are emitting light rays simultaneously to expose the instant film 101. This exposure method serves to decrease overall exposure time to less than one-second, a feature which enables a user to produce an entire image on the instant film 101 two orders of magnitude faster than when using sequential printing technology.

Figure 2:
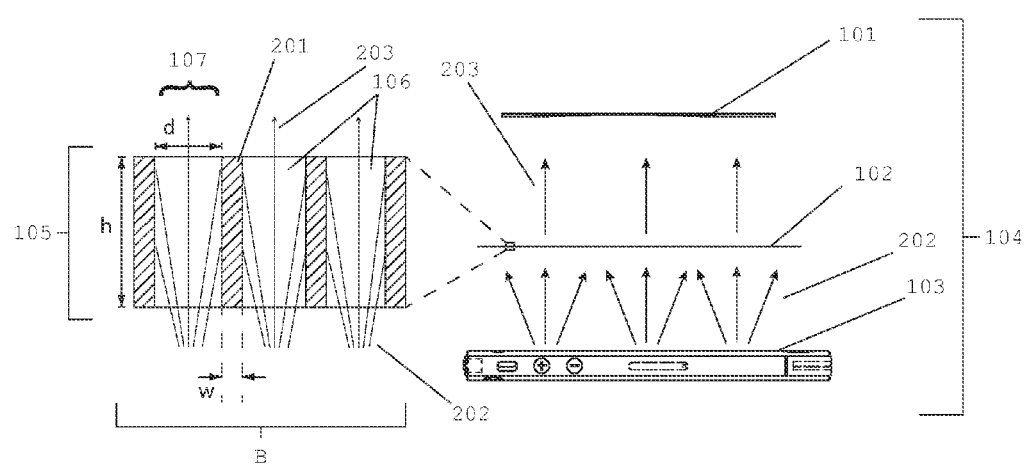
FIG. 2 is a side view of the system of FIG. 1, illustrating the absorption by the optical collimation layer of non-orthogonal light rays emitted by the display screen.

FIG. 2 is a diagrammatical view of the core mechanism 104 in FIG. 1, with representations of light vectors (i.e., arrows) included in the figure for clarity of illustration. The light vectors represent the various rays of light emanating from the light emitting display screen 103. The light vectors 202 emanate in various directions from the display screen 103 when entering the optical collimation layer 102. However, because the optical collimation tunnels 106 are oriented normal (i.e., perpendicular) to the surface of the optical collimation layer 102, only orthogonal light 203, which emanates in a substantially orthogonal direction from the display screen 103, can pass entirely through the optical collimation layer 102 to impinge upon the instant film 101.

A cross sectional view 'B' of the microscopic section 105 illustrates that each tunnel 106 selectively passes primarily the near-orthogonal to orthogonal light 203, that is, light rays that travel through the optical collimation layer 102 without impinging on the inner surfaces of opaque walls 201 are passed through. Correspondingly, essentially all the non-orthogonal light (i.e., off-axis light photons) are absorbed or attenuated at the inner surfaces of the opaque walls 201 in the optical collimation layer 102, and are not passed through the optical collimation layer 102.

It can be appreciated by one skilled in the art that, when the optical collimation tunnels 106 are oriented at an angle other than 90° with respect to the surface of the optical collimation layer 102, for example 15° from normal, only those light rays which emanate from the display screen 103 at approximately the same angle of orientation (e.g., 15°) from normal, will pass entirely through the optical collimation layer 102 to impinge upon the instant film 101. This configuration may be used, for example, when it is desired to attenuate the level of light reaching the instant film 101 from the display device 103. As should be understood, the basic requirement to insure a clear image on the instant film 101 is that the light rays emanating from the optical collimation layer 102 be substantially parallel to one another when incident upon the instant film 101. This requirement holds whether the light rays are orthogonal on the instant film 101, or are incident on the instant film 101 at another angle.

FIG. 2 also defines an internal diameter or opening width of a constant d, a tunnel height or length h, and a tunnel wall width w. The diameter or opening size d of the tunnel 107 is preferably proportional to the size (i.e., the width) of a pixel in the source display screen 103. In an iPhone for example, pixel sizes may be approximately 45 microns in width. In an exemplary embodiment, an optimal tunnel diameter d may range from about four times the size of a display pixel to about one eighth the size of a display pixel. That is, for the iPhone, an optimal tunnel diameter d may be about 5 microns up to about 200 microns for acceptable photo resolution. The optical collimation layer 102 tunnel height h may be approximately two millimeters, roughly two orders of magnitude greater than the diameter d or opening size of the tunnel 107.

In general the aspect ratio h/d may be maximized within the dimensional constraints of the apparatus 1108 (seen in FIG. 11 below) in order to minimize the divergence of light filtered by the optical collimation layer 102. The tunnel wall width w may be thick enough to absorb off-axis light, for example, five to ten microns may be specified. However, the width of the walls w can also be increased further to decrease the total light transmission ratio of the material, to function in a manner similar to a neutral density filter. This may be considered if the display screen 103 exhibits too high a level of brightness for the instant film 101 medium, and thus, requires a controlled amount of attenuation.

Figure 3:
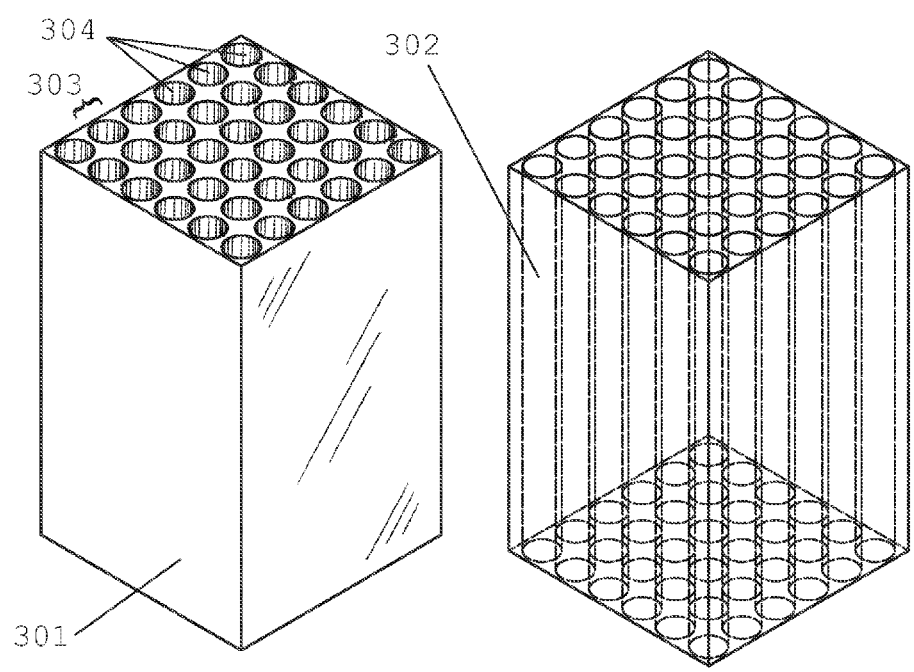
FIG. 3 is an isometric, microscopic, cut-out view of a second embodiment of the optical collimation layer.

FIG. 3 is an illustration of an alternate optical collimation layer configuration showing a microscopic collimation layer section 301 comprising collimation tunnels 304 having openings of essentially round cross sections. Accordingly, as the optical collimation tunnels 304 have round openings, the plurality of optical collimation tunnels 304 can form a rectangular array, as shown, or can form a hexagonal array (not shown), or any other closely packed configuration, depending on the arrangement of pixels in the display screen 103. It can be appreciated by one skilled in the art there are several shapes and variations which would work equally well as openings with square cross sections and openings with round cross sections. In addition, the tunnels 106, 304 may be filled with air, vacuum, or with any clear substrate such as glass or a polymer. Furthermore, the substrate filling the tunnels 106 and 304 may be tinted if the display screen 103 is too bright for the instant film 101 being used. In addition to brightness, the color and other properties of incoming light 202 may be adjusted by the composition of materials and dopants in the collimation layer 102. Several techniques for creating these optical collimation layers are described below:

Laser cutting techniques can be used with opaque sheets of about 1/16" to about 3/16" plastic or similar laser-compatible material, to fabricate an optical collimation layer of opaque material, here exemplified by a microscopic opaque collimation layer section 301. Each tunnel 303 cut by the laser can be made to sub-100 micron diameters using a cutter with a high DPI specification, such as 1600 or 3000 DPI.

An industrial class jeweler's micro-drill press may be used to fabricate the microscopic collimation layer section 301, from a substantially opaque material. The inner tunnels of the collimation layer 301 are outlined in a "see-through" microscopic representation 302. Commercially available presses advertise drill bits with 25 micron diameters, which are suitable sizes for collimation layer tunnel holes. A CNC motor can be used to position the bit as it repeatedly drills appropriate holes into the substantially opaque material.

Micro-louver sheets marketed as "Privacy Film" by Minnesota Mining and Manufacturing Company (3M) can be used to fabricate the optical collimation layer 102. The Privacy Film comprises louvers spaced roughly 60 microns apart to achieve a 48-degree viewing angle. Layering several Privacy Film sheets at various angles, e.g., 90, 45 and 22.5 degrees can produce a matrix that selectively blocks off-axis light.

Three-dimensional printing techniques such as sintering, FDM or other single or multi-material printing technologies can also fashion the collimating layer 102, as represented by either the microscopic collimation layer section 105 or the microscopic collimation layer section 301, by alternating between opaque material and clear material or void space. Many commercially available 3D printers, such as PolyJet, are capable of printing in high resolution up to 16 microns with multiple materials.

Nano-lithography techniques can also produce an optical collimation layer 102 by patterning the desired matrix using photoresist material, and then etching away the holes using an appropriate etching solution.

Figure 4:
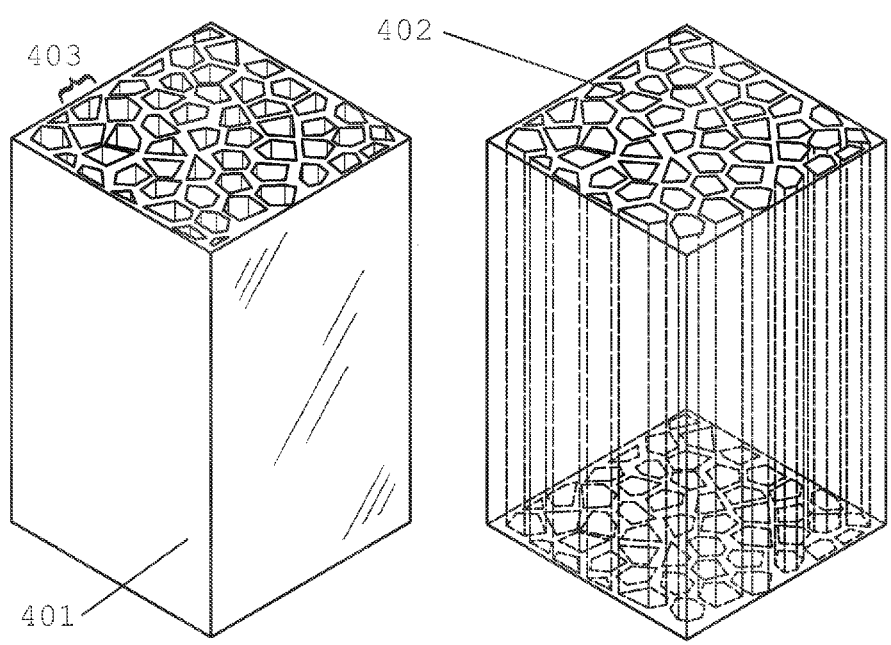
FIG. 4 is an isometric, microscopic, cut-out view of a third embodiment of the optical collimation layer.

FIG. 4 is an illustration of still another collimation layer configuration, represented by microscopic collimation layer section 401. Fused fiber optic arrays can also act as collimating layers, creating the random distribution pattern in the microscopic collimation layer section 401. Small optical fibers with opaque cladding may be fused together under high temperature and pressure until they form a solid block. Each fused fiber can be seen along the surface of a "see-through" representation of the microscopic collimation layer section 402. It can be readily seen from the diagram of tunnel 403 that any tunnel shape or aspect ratio would perform equally well. It is also important to note that the shape of each collimation tunnel 403 in a given array need not be uniform, as shown in the diagram.

The foregoing descriptions are examples of what meets the criteria of sheet material suitable for fabricating the optical collimation layer 102. However, any additional manufacturing methods that have not been discussed, but create optical collimation layers similar in spirit and essence to what is described here also fall under the present invention's scope of protection.

Figure 5:
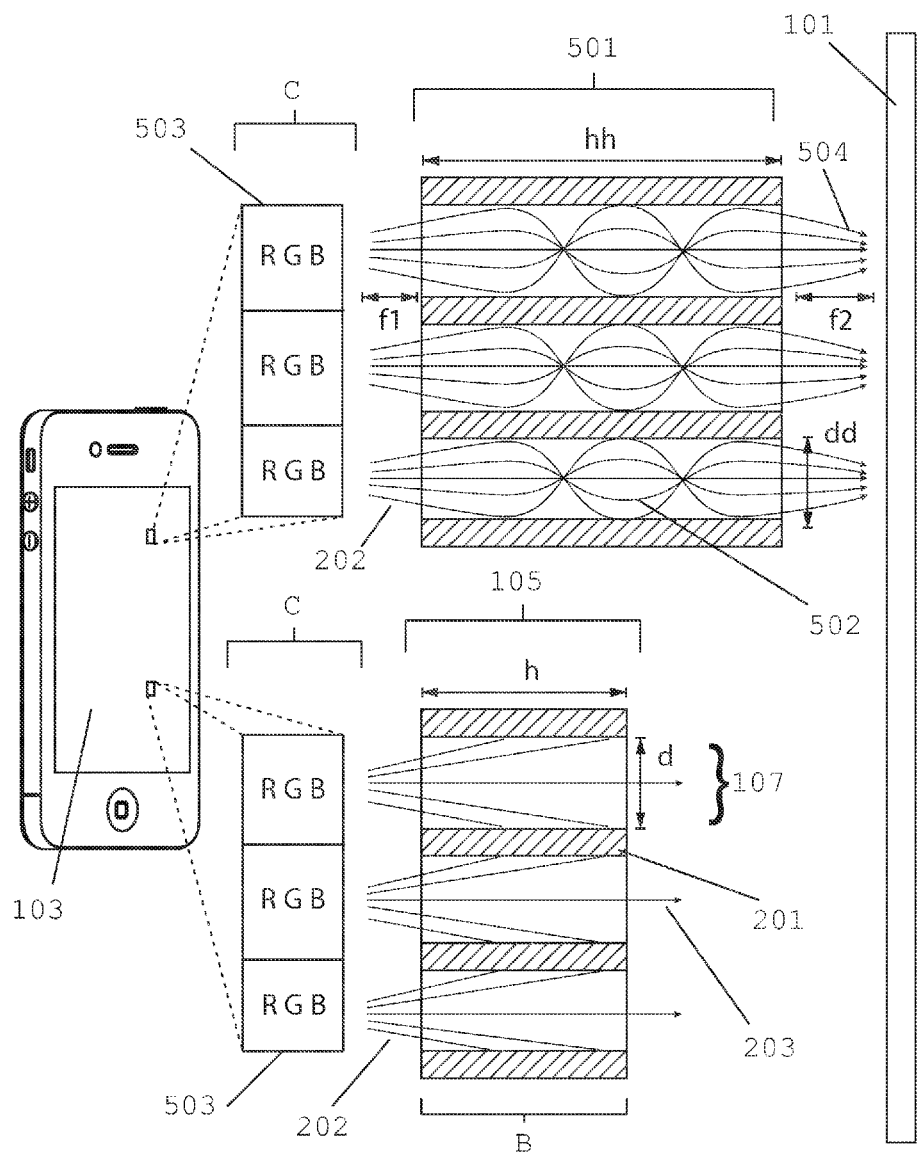
FIG. 5 is a side-by-side comparison of an optical collimation layer and a Gradient Index (GRIN) Rod Microlens array

FIG. 5 summarizes the advantages of optical collimation layer 102 over a gradient index (GRIN) rod lens array 501. A full discussion of lenses with refractive index gradients can be found in U.S. Pat. No. 3,843,228 to Nippon Selfoc Co. (1984). It can be appreciated by one skilled in the art that microlens arrays require highly precise alignment in order to function. The light 202 emanating from pixels 503 in zoomed punch-out C of the display screen 103 generally follows complex paths 502 through the GRIN array 501 that are dictated by Snell's law. These paths must be carefully engineered to produce a coherent image. In order for GRIN array 501 to produce focused light 504 to impinge upon instant film 101, the distance f1 between the display pixels 503 and the GRIN array 501 must be exact, with very little tolerance. Similarly, the distance f2 between the GRIN array 501 and the instant film 101 must also be exact.

In practice, the rod height hh of GRIN array 501 is many times larger than the tunnel height h in the microscopic collimation layer section 105, because sufficient clearance is required for emanating light 202 to bend appropriately. Collimation layer 102 has no such constraints. There are no exact distances such as f1 and f2 that must be maintained. Because of this, the collimation layer 102 is much more flexible and can be used in conjunction with a multitude of display screens. Finally, the cost of manufacturing GRIN array 501 with rod diameters dd that are equal to collimation tunnel diameters d is far greater than many of the aforementioned manufacturing methods for collimation layer 102.

Figure 6:
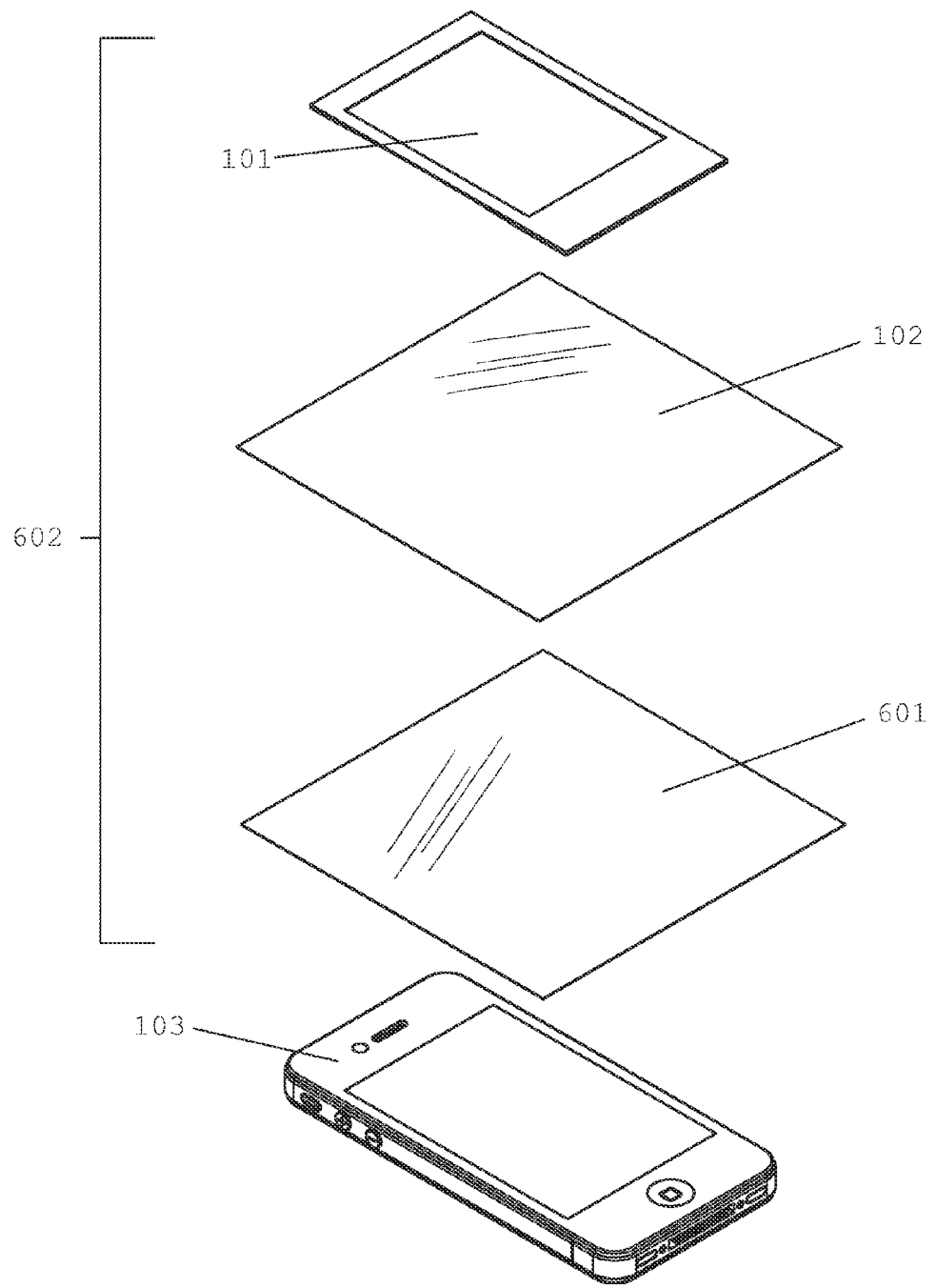
FIG. 6 is an alternate embodiment of the system of FIG. 1 including a shutter layer.

FIG. 6 is an alternate embodiment of a core mechanism 602. The enhanced core mechanism 602 incorporates a shutter layer 601 disposed between the light emitting display screen 103 and the instant film 101. The purpose of the shutter layer 601 is to eliminate the need for the display screen 103 to cycle on and off in order to expose the instant film 101. This configuration eliminates the need for specialized software to switch the display on and off with precise timing, greatly enhancing the user experience. The shutter layer 601 accomplishes this by switching from a transparent to opaque state based on an electronic or mechanical signal. In the opaque state, no light passes through to the instant film 101 development surface. This is equivalent to the display screen 103 being in the "off" state. Conversely, the transparent state of the shutter layer 601 allows nearly all light through, and is equivalent to the display's ON state. As can be appreciated by one skilled in the art, there are different ways to create a shutter layer.

For example, LCD Shutters are arbitrarily sized single-pixel or multi-pixel LCD's where two states, transparent and opaque, can be toggled via an electronic signal. These shutters can be purchased from Liquid Crystal Technologies in Cleveland, Ohio.

Various types of "smart glass" are suitable shutter layers. These are often marketed as energy-cost saving devices due to their ability to change light transmission properties. Suspended particle device (SPD) technology developed by Research Frontiers, Electrochromic glass, Micro-Blinds, and Polymer Dispersed LCD (PDLC) technology can all be fashioned into suitable shutter layers.

Linear polarizing filters may be used as shutter layers. Orienting two such filters at ninety degree angles would block essentially all light transmission, whereas smaller angles down to zero would allow progressively more light through.

Similar to the manufacturing techniques listed for optical collimation layers, the foregoing descriptions are examples of what meets the criteria of a shutter layer. However, any additional manufacturing methods that have not been discussed, but create shutter layers similar in spirit and essence to what is described here also fall under the present invention's scope of protection.

Figure 7:
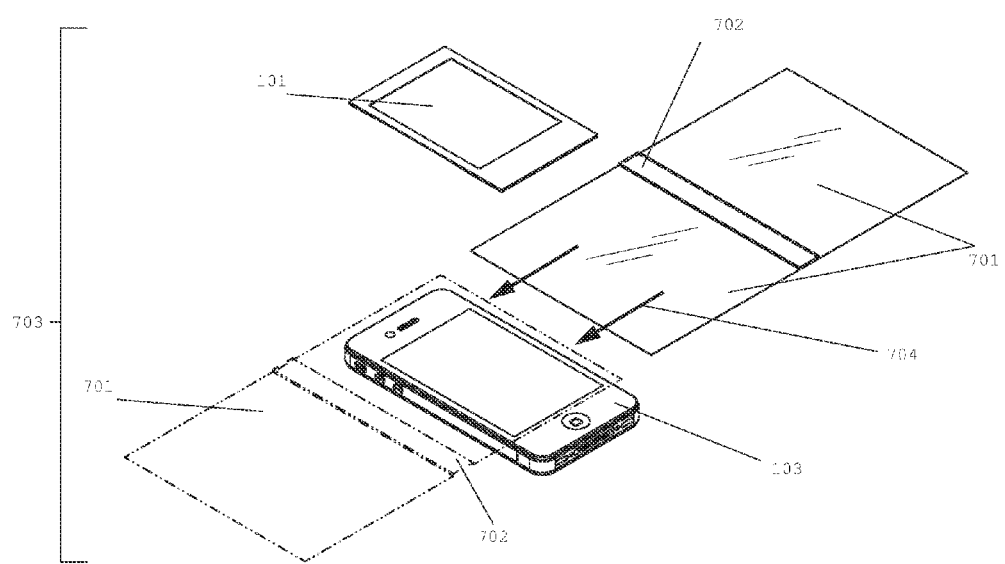
FIG. 7 is an isometric view of an alternate embodiment of the system of FIG. 1 in which the optical collimation layer comprises a narrow optical collimation sheet embedded in an opaque ribbon.

FIG. 7 is an isometric view of an optical collimation material having a rectangular shape, denoted here as narrow sliver 702. Narrow sliver 702 is embedded in an opaque "ribbon" 701, as part of an enhanced core mechanism 703. In this embodiment, the size and shape of the narrow sliver 702 is less than the area of the light emitting display screen 103, such that at any particular time, the narrow sliver 702 exposes only a part of the sheet of instant film 101 to the light emitting display screen 103.

However, it should be understood that the long dimension of the rectangular narrow sliver 702 is at least as large as either the length or the width of the instant film 101. The ribbon 701 can be made of any flexible material so long as it is substantially opaque to visible light. The ribbon 701 is disposed between the display screen 103 and the instant film 101, similar to the configurations shown in FIG. 1 and FIG. 2. In the absence of any ambient light, the ribbon 701 slides horizontally between the instant film 101 and the powered display screen 103, exposing the instant film 101 by scanning across the surface of the light emitting display screen 103.

This enhanced core mechanism 703 yields two important advantages. First, similar to the shutter layer 601 shown in FIG. 6, the display screen 103 can be kept powered up throughout the entire exposure process. Second, the enhanced core mechanism 703 dramatically decreases the amount of collimating material required to expose the sheet of instant film 101. The collimating layer 102 may be one of the most expensive components of the apparatus, and the ribbon design reduces its per-device cost by about 50 times.

Figure 8:
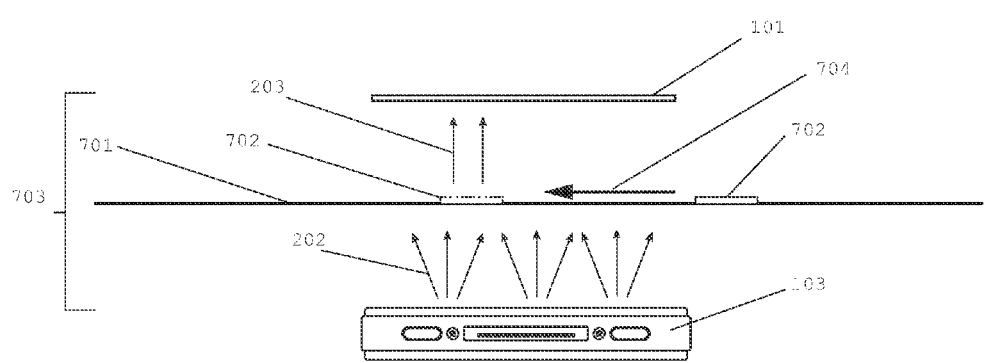
FIG. 8 is a side view of the system of FIG. 7.

FIG. 8 is a side view of the enhanced core mechanism 703 in FIG. 7, with light vectors provided for clarity of illustration. The instant film 101 is irradiated by orthogonal light vectors 203 at the instantaneous location of the embedded narrow sliver 702 of the optical collimation layer 102, as the narrow sliver 702 slides in the direction of the arrow 704 until the entire photo 101 has been exposed. The light 202 emanating from the display screen 103 that is not directly under the narrow sliver 702 is completely absorbed into the opaque ribbon 701.

The speed 704 of the narrow sliver 702 is tunable depending on the screen brightness of the display screen 103. In an exemplary embodiment, an exposure time of 250- to 750 milliseconds may produce a properly exposed image. Preferably, the velocity of the ribbon is (i) proportional to the length of the instant film 101 divided by the desired exposure time, and (ii) inversely proportional to the brightness of the display screen 103. A velocity of 60 millimeters per second may be suitable for an iPhone 4s at 50% brightness, exposing an sheet of instant film 101 that is 46 millimeters long.

Figure 9:
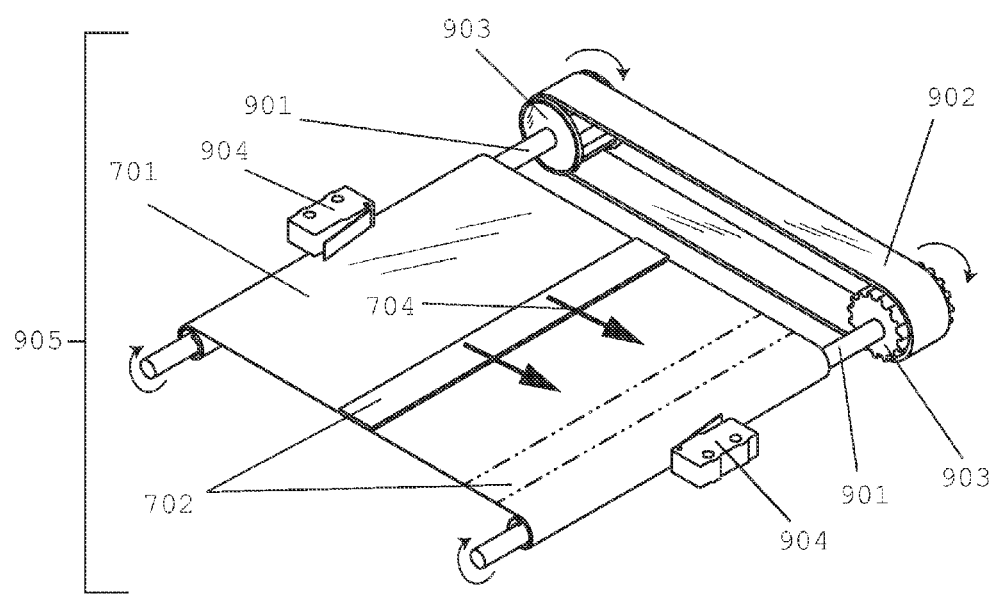
FIG. 9 is an alternate embodiment of the opaque ribbon of FIG. 7, including gears and a belt.

FIG. 9 is an isometric view of an alternative embodiment of an enhanced core mechanism 905. The ends of the opaque ribbon 701 are wound onto two parallel shafts 901. Each shaft 901 is attached to a double-flanged gear 903, and each gear 903 is positioned to engage a timing belt 902. The timing belt 902 may be made of neoprene or urethane. By rotating the gears 903, the shafts 901 are induced to rotate in unison. This causes the narrow sliver 702 to move between the two ribbon shafts 901. The gears 903 may be turned via a rotary motor (not shown) or the timing belt 902 can be directly pulled in the direction of either gear 903 in order to change the position of the narrow sliver 702.

Simple mechanical or electromechanical control mechanisms may be used to guide the movement of the narrow sliver 702 between the two shafts 901. For example, standard micro contact switches 904 may be placed directly on top of each shaft 901. When the narrow sliver 702 approaches either shaft 901, the narrow sliver 702 may trigger one of the contact switches 904. This trigger may cut off power to a driving motor (not shown), or provide audio/visual feedback if the user is manually turning the shafts 901.

Figure 10:
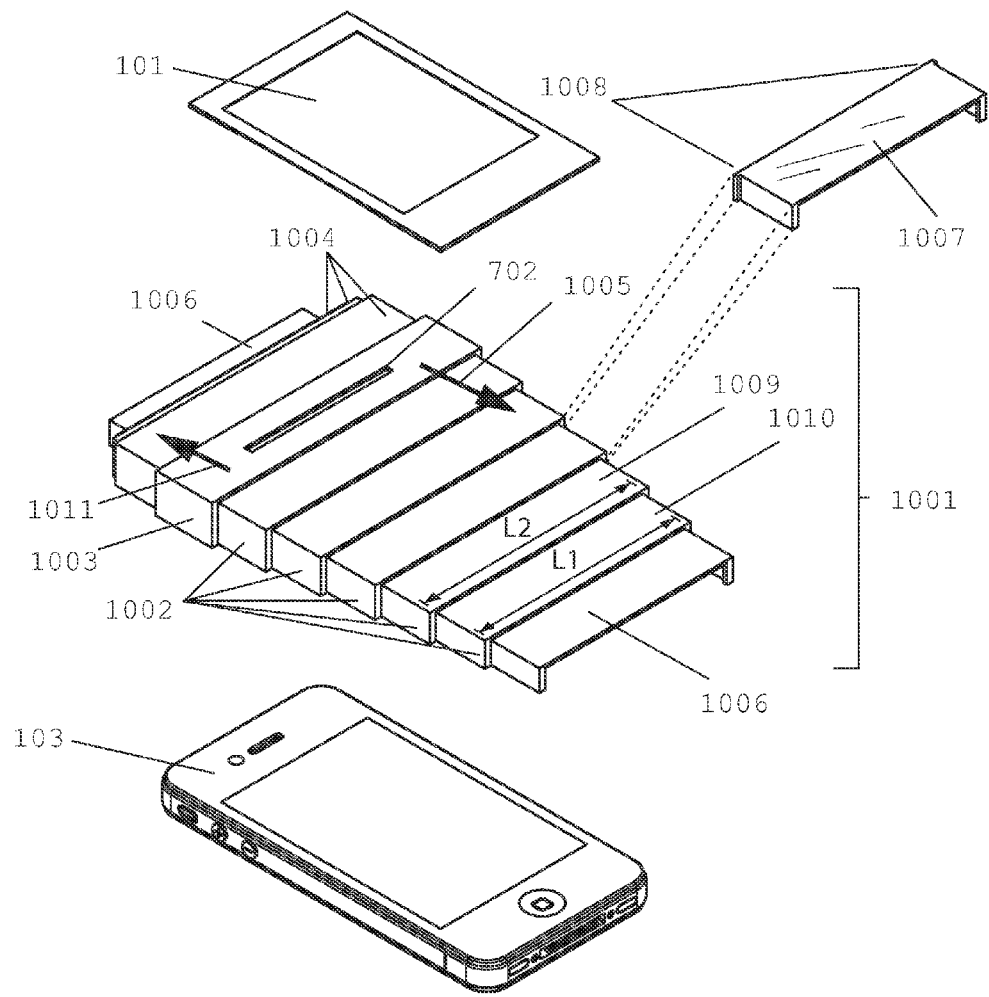
FIG. 10 is an alternate embodiment of the system of FIG. 1 in which the optical collimation layer comprises a narrow optical collimation sheet embedded in a telescoping slider mechanism.

FIG. 10 is an isometric view of an alternative embodiment of an enhanced core mechanism 1001. In this variant, the narrow sliver 702 is embedded in telescoping slider mechanism 1001 rather than opaque ribbon 701. The telescoping mechanism 1001 consists of two identical sliding panel sets 1002 and 1004. One such panel 1007 is extracted from the set 1002 in order to illustrate its hollow rectangular structure, and reveal two protruding notches 1008. Each panel in set 1002 shares this identical structure, but has consecutively increasing lengths. For example, the panel 1009 having length L2 will be slightly longer than the panel 1010 having length L1. A central panel 1003 is fastened to both sets 1002 and 1004, and it may slide in the direction of both arrows 1005 and 1011. The narrow sliver 702 is embedded into the surface of the central panel 1003.

As the central panel 1003 moves in the direction of arrow 1005, the telescoping panels 1002 effectively "retract" by sliding into each other until they are almost directly stacked on top of one another. At the same time, the panels 1004 slide apart, effectively "expanding" until the central panel stops moving. The two protruding notches 1008 on each panel serve to "lock" sliders together. They prevent adjacent panels 1002 from sliding too far apart and allowing unwanted light from display screen 103 to pass through to the instant film 101. The two end-panels 1006 are stationary, and define the traversal boundaries of the central panel 1003.

The telescoping mechanism 1001 design achieves the same end result as the opaque ribbon mechanism 905, namely the selective propagation of light from the display screen 103 through the collimation layer 102 and onto the instant photo 101. Its advantages over mechanism 905 include better control over the precise position and speed of the narrow sliver 702 as it traverses the instant film 101. This is because the central panel 1003 can be directly fastened to a timing belt (not shown), whereas the opaque ribbon 701 does not move linearly with respect to timing belt 902 and may behave differently depending on its tautness and thickness. Additionally, the panels 1002 and 1004 do not need to be thin or flexible like the opaque ribbon 701. Therefore they may be easier to assemble and might provide a more robust, dependable light barrier.

Relatively simple variations on the telescoping mechanism may include a accordion design (not shown). Here the telescoping panels 1002 and 1004 would each be replaced by single pieces of opaque cloth or rubber that fold and collapse as an accordion does.

Figure 11:
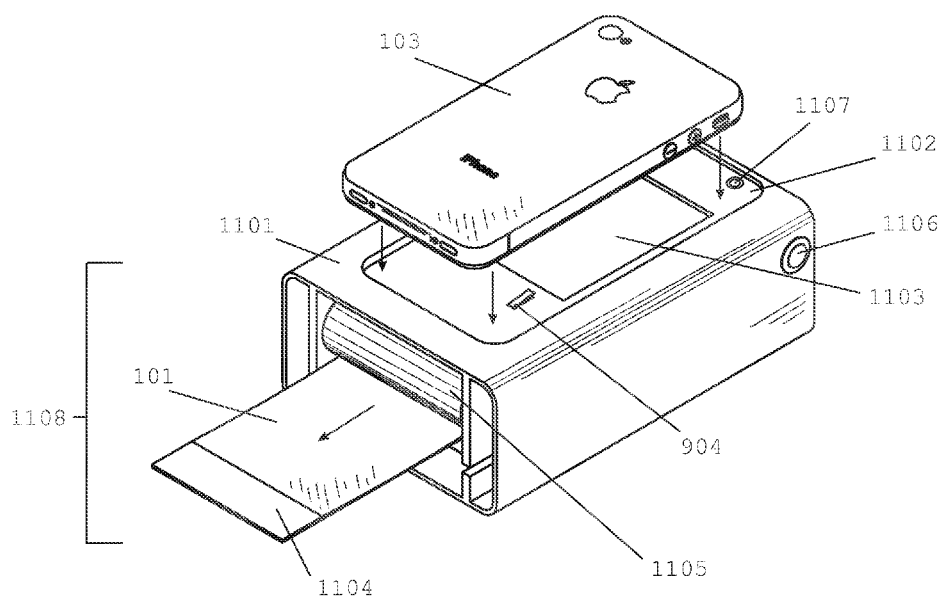
FIG. 11 is an isometric view of an instant film printer including the optical collimation layer and any one of the aforementioned shutter mechanisms.

FIG. 11 is a high-level isometric sketch of an instant film printer 1108 that incorporates the mechanisms described in one or more of the previous figures. The instant printer 1108 includes an outer casing 1101 that may be made of any material so long as it is substantially opaque to light. The display screen 103 is set into a fitted surface 1102 on the instant printer 1108 which has an exposure window 1103 that lines up with the rectangular pixel array of the display screen 103. The fitted surface 1102 may have one or more embedded micro-contact switches 904 to detect the presence of the display screen 103. This would protect against unwanted exposures if the button 1106 is inadvertently pressed.

The fitted surface 1102 may also have an embedded LED 1107 to counteract the dimming effect of ambient light sensors that are common among mobile phone or smartphone display screens 103. Once exposed, the instant film 101 may be ejected from the instant film printer 1108 via a pair of adjacent rollers 1105. The rollers 1105 function to burst the instant film's chemical pouch 1104 causing development agents in the pouch 1104 to evenly coat the silver halide layer of the photo 101 and complete the image development process.

Figure 12:
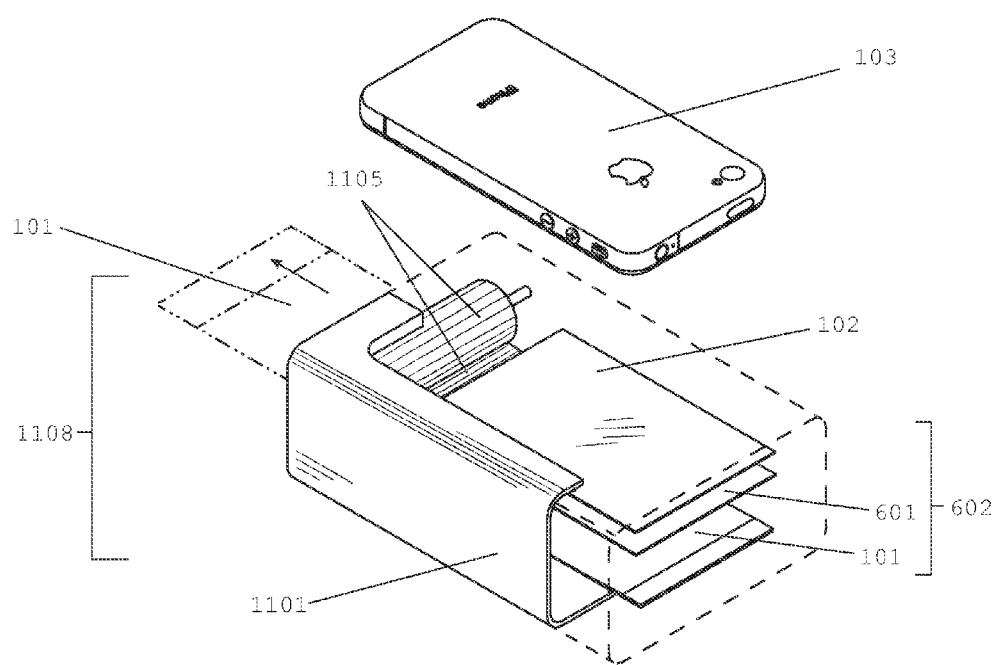
FIG. 12 is an isometric view of the instant film printer of FIG. 11 showing internal structure.

FIG. 12 is a rear isometric view of the instant film printer 1108 in FIG. 11, with the outer plastic layer 1101 cut away to expose its inner components and shutter mechanism 602 in greater detail. The display screen 103 is situated directly above the mechanism 602 consisting of a shutter layer 601 and the optical collimation layer 102, as described above in FIG. 6. At the outset, the shutter layer 601 is in the opaque state. When the user initiates the printing process, the shutter layer 601 briefly cycles to a transparent state, which sends light through the optical collimation layer 102 and onto the instant film 101. Next, the shutter cycles back to an opaque state, and the photo is ejected by the rollers 1105. This completes the printing process.

Figure 13:
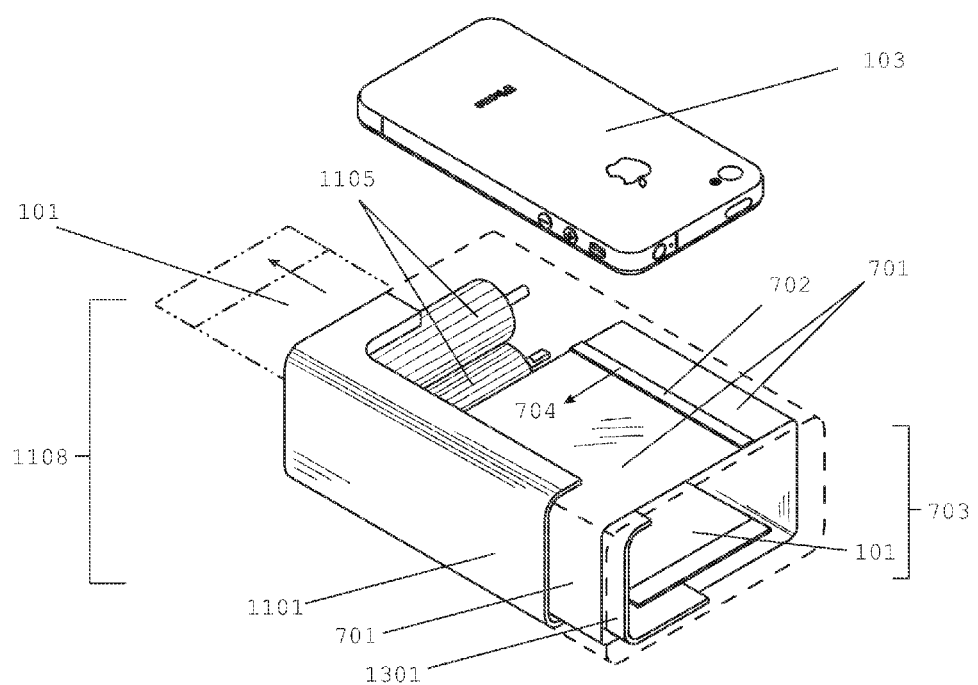
FIG. 13 is an alternate embodiment of the instant film printer in FIG. 11 including the opaque ribbon in FIG. 6.

FIG. 13 is another rear isometric view of the instant film printer 1108, with the outer plastic layer 1101 cut away. Here the instant film printer 1108 houses an alternate shutter mechanism 703. The display screen 103 is situated adjacent the opaque ribbon 701 with the embedded narrow sliver 702, described above in FIG. 7 and FIG. 8. The ribbon 701 has been fashioned into a loop so that the narrow sliver 702 can slide freely without the ribbon 701 protruding out of the device. This places an extra constraint on the ribbon 701, that is, the ribbon 701 must be flexible with an appropriate turn radius of less than about one quarter inch so that it can be fitted and operated within the printer. A suitable ribbon material might be a thin 0.003 inch sheet of opaque Mylar, cellulose plastic, or flocking paper. The ribbon loop 701 is fitted on a narrow track between surfaces 1101 and 1301, which holds it taut and directs its motion. Inside the ribbon loop is the sheet of instant film 101 which is aligned with the display screen 103 and the collimating sliver 702.

When the sheet of instant film 101 is being exposed, the loop 701 is pulled around the track 1101, and the narrow sliver 702 traverses the photo in the direction of the arrow 704. Once exposed, the instant film printer 1108 then pushes the instant film 101 in the direction of the rubber rollers 1105. The rollers 1105 grip and extrude the instant film 101 to the phantom position drawn, while simultaneously spreading the development agents over the silver halide layer. This completes the printing process.

Figure 14:
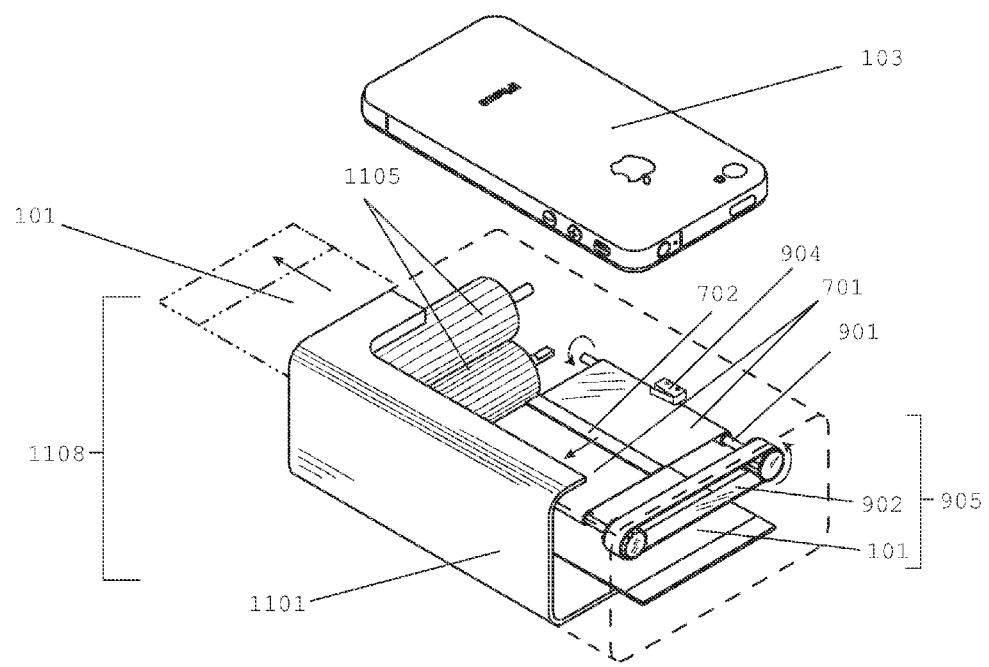
FIG. 14 is an alternate embodiment of the instant film printer in FIG. 11 including gears and a belt.

FIG. 14 is still another rear isometric view of the instant film printer 1108, with the outer plastic layer 1101 cut away.

The instant film printer 1108 houses an alternate shutter mechanism 905. This configuration allows the instant film printer 1108 to incorporate opaque ribbon 701 without requiring the inner ribbon track 1301, shown in FIG. 13. The ribbon roller shafts 901 are fastened to a pair of gears 903 which are connected by a rubber belt 902. After the narrow sliver 702 has traversed the length of the instant film 101, the photo is ejected from the instant film printer 1108.

Figure 15:
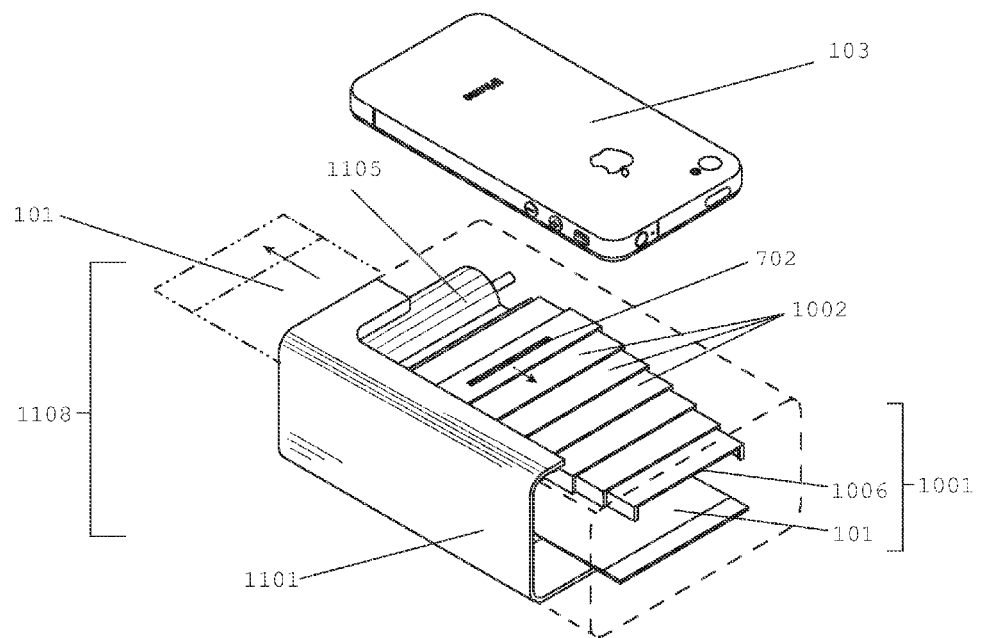
FIG. 15 is an alternate embodiment of the instant film printer in FIG. 11 including a telescoping slider mechanism.

FIG. 15 is yet another rear isometric view of the instant film printer 1108, with the outer plastic layer 1101 cut away. The instant film printer 1108 houses an alternate telescoping shutter mechanism 1001. After the narrow sliver 702 has traversed the length of the instant film 101, the photo is ejected from the instant film printer 1108.

Figure 16:
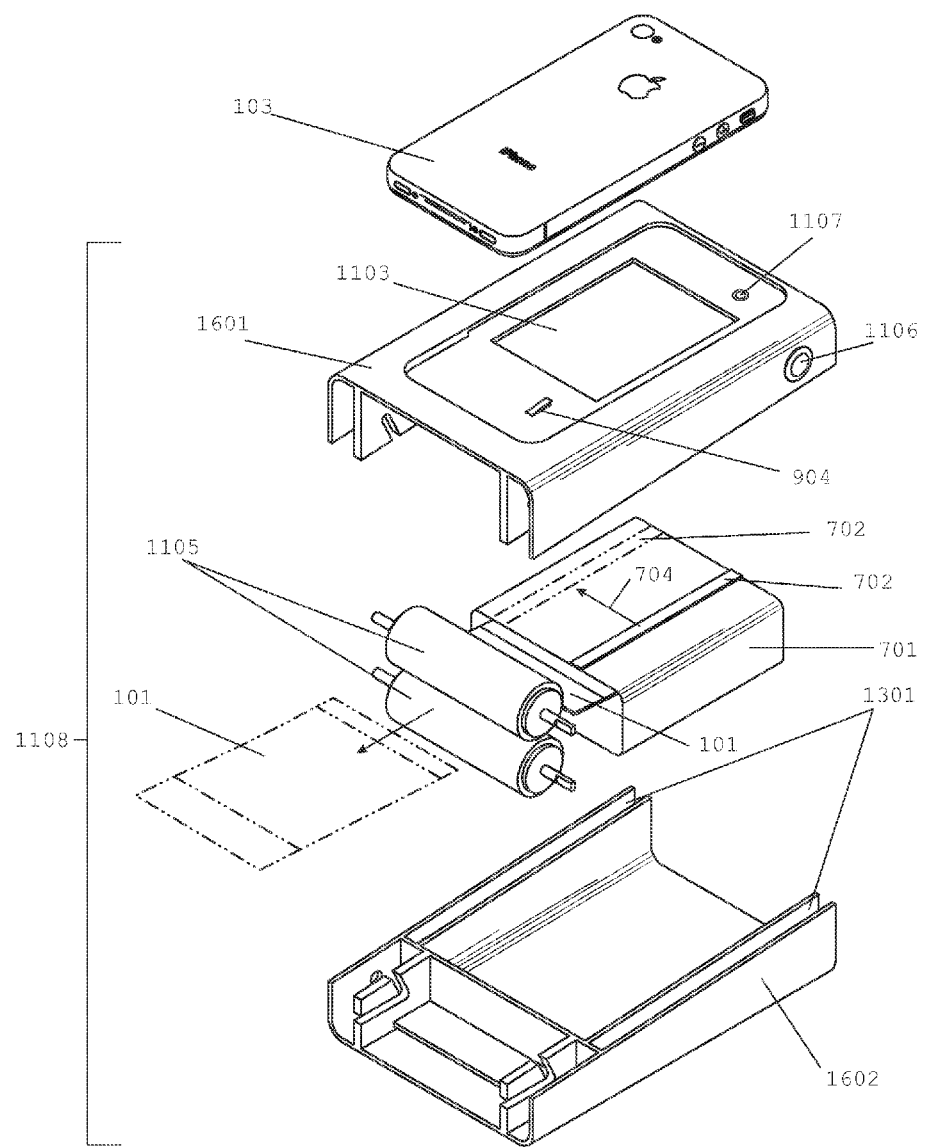
FIG. 16 is an exploded isometric view of the instant film printer of FIG. 11.

FIG. 16 is an exploded isometric view of the instant film printer 1108 that fully exposes mechanism 703. Plastic case shells 1601 and 1602 form a housing to enclose the main components of the device: the rubber rollers 1105, the opaque ribbon loop 701, and the collimating sliver 702. The opaque ribbon 701 is threaded through the printer's inner track 1301 to hold it taut and guide its motion. Instant film 101 is exposed when the opaque ribbon 701 shifts the narrow silver 702 in the direction of the arrow to its drawn phantom position. Finally, the rollers 1105 extrude the instant film 101 in the direction of the drawn arrow to its phantom position.

In the diagrams provided, only a single sheet of instant film 101 is shown inside the instant film printer 1108. However, in practice, a cartridge (not shown) containing several sheets of instant film 101 can be loaded into the instant film printer 1108 so that the instant films 101 can be printed sequentially without reloading. Additionally, for the sake of clarity, various mechanical components have not been explicitly drawn. For example, the rollers 1105 may be turned using standard rotary motors, a hand crank, or any other suitable mechanism. Alternatively, the user may pull on the instant film 101 itself and turn the rollers 1105 using frictional force. Similarly, the opaque ribbon 701 may be pulled by a linear motor, by hand, or attached to gears and pulled by a rotary motor. The particular mechanisms used in the instant film printer can be readily fashioned by a mechanical engineer or other qualified technician.

In operation, a user places the Smartphone, tablet, or other light emitting display screen 103 flush against the exposure window 1103 of the instant film printer 1108. The display screen 103 is displaying the image that the user wishes to print. The user signals the instant film printer 1108 to begin exposing the instant film 101 by pressing a button 1106 on the device, or by turning a crank (not shown) if the printer 1108 is not otherwise powered. The instant film printer 1108 exposes the instant film 101 which is then extruded out of the instant film printer 1108 by a pair of rollers 1105. The user now has an exposed instant film 101 of the screen contents of his display screen 103.

It is to be understood that the description herein is only exemplary of the invention, and is intended to provide an overview for the understanding of the nature and character of the disclosed illumination systems. The accompanying drawings are included to provide a further understanding of various features and embodiments of the method and devices of the invention which, together with their description serve to explain the principles and operation of the invention.

REFERENCE NUMERALS

101 Instant Film
102 Optical Collimation Layer
103 Light Emitting Display Screen 104 Core Mechanism
105 Microscopic Collimation Layer Section
106 Plurality of Optical Collimation Tunnels
107 Single Optical Collimation Tunnel
201 Opaque Wall of Optical collimation tunnel
202 Emanating Light Vectors
203 Collimated Light Emanating from Collimation Layer
301 Microscopic Collimation Layer Section with Round Holes
302 See-through Drawing of Collimation Layer with Round Holes
303 Single Collimation Tunnel in Collimation Layer with Round Holes
304 Plurality of Collimation Tunnels in Collimation Layer with Round Holes
401 Microscopic Fused Fiber Array Collimation Layer Section
402 See-through Drawing of Microscopic Fused Fiber Array Collimation Layer Section
403 Single Collimation Tunnel in Fused Fiber Array
501 Microscopic Gradient Index (GRIN) Rod Microlens Array Section
502 Complex Light Refraction Paths
503 Enlarged Display Pixels
504 Focused light
601 Shutter Layer
602 Shutter Layer Collimation Mechanism
701 Opaque Ribbon
702 Embedded Collimating Sliver
703 Rolling Shutter Collimation Mechanism
704 Sliding Direction/Velocity of Collimating Sliver
901 Opaque Ribbon Roller Shaft
902 Rubber Timing Belt
903 Flanged Pulley Gear
904 Micro Contact Switch
905 Rolling Shutter Mechanism with Belt Pulley
1001 Telescoping-Panel Mechanism
1002 Right Sliding Panel Set
1003 Central Panel with Collimation Sliver
1004 Left Sliding Panel Set
1005 Slide Direction/Velocity of Central Slider Panel
1006 Stationary End-Panels
1007 Extracted Sliding Panel
1008 Panel Locking Notches
1009 Sliding Panel with Length L2
1010 Sliding Panel with Length L1
1011 Opposite Slide Direction/Velocity of Central Sliding Panel
1101 Outer Plastic Shell
1102 Sunken Display Device Cavity
1103 Instant Film Exposure Window
1104 Instant Film Development Pouch
1105 Rubber or Metal Roller
1106 Print Button
1107 Ambient Light Sensor LED
1108 Instant Film Printer Apparatus
1301 Inner Ribbon Track
1601 Outer Plastic Shell Top Half
1602 Outer Plastic Shell Bottom Half

What is claimed is:

1. A printing device suitable for printing an image comprising:
a light emitting display screen for displaying the image to be printed;
an undeveloped sheet of instant film; and
a non-focusing, selectively absorbent optical collimation layer disposed between said light emitting display screen and said sheet of instant film, wherein the optical collimation layer includes a sheet of material containing an array of substantially parallel optical collimation tunnels, each optical collimation tunnel extending from one surface of said sheet of material to the other surface of the sheet of material.

2. The printing device of claim 1 wherein said sheet of material is shaped and sized so as to cover at least one of (i) the entire surface of the light emitting display screen or (ii) the entire surface of the sheet of instant film.

3. The printing device of claim 1 wherein said sheet of material is substantially rectangular in shape, and has a long dimension at least as large as either (i) the length of the light emitting display screen or (ii) the width of the light emitting display screen.

4. The printing device of claim 1 further comprising a shutter layer between said sheet of instant film and the display screen, wherein the shutter layer functions to provide a predetermined exposure period.

5. The printing device of claim 1 wherein said optical collimation tunnels have opening dimensions of approximately one eighth to four times the width of the pixels in said light emitting display screen.

6. An instant film printer suitable for printing an image comprising:
a light emitting display screen of an electronic device displaying the image to be printed;
an undeveloped sheet of instant film; and
a non-focusing, selectively absorbent optical collimation layer positioned proximate said sheet of instant film, said optical collimation layer including a sheet of material containing an array of optical collimation tunnels, wherein each said optical collimation tunnel extends from one surface of said sheet of material to the other surface of said sheet of material.

7. The instant film printer of claim 6 further comprising an opaque ribbon supporting said optical collimation layer, said opaque ribbon functioning to move said optical collimation layer relative to the light emitting display screen.

8. The instant film printer of claim 7 further comprising two parallel shafts for supporting said opaque ribbon, each said shaft attached to a gear for engaging a timing belt.

9. The instant film printer of claim 6 further comprising a telescoping mechanism supporting said optical collimation layer, said telescoping mechanism functioning to move said optical collimation layer relative to the light emitting display screen.

10. The instant film printer of claim 6 further comprising a pair of rollers adapted for bursting a chemical pouch in said sheet of instant film.

11. A method of printing directly from a light emitting display screen comprising the steps of:
providing a sheet of undeveloped instant film;
providing a non-focusing, selectively absorbent optical collimation layer formed from a sheet of material shaped and sized so as to cover at least a portion of the display screen, said sheet of material containing a plurality of optical collimation tunnels, wherein each optical collimation tunnel extends from one surface of said sheet of material to the other surface of said sheet of material, said optical collimation layer further having opaque walls between adjacent optical collimation tunnels;
placing said optical collimation layer between the display screen and said sheet of instant film; and
exposing said sheet of instant film to light emanating from said display screen and passing through said array of optical collimation tunnels.

12. The method of claim 11 wherein the step of exposing said sheet of instant film comprises the step of powering the display screen on and then off for a predetermined exposure period.

13. The method of claim 11 further comprising the step of placing a shutter layer between said optical collimation layer and the display screen, said shutter layer functioning to provide a predetermined exposure period.

14. The method of claim 11 further comprising the step of moving said optical collimation layer across said light emitting display screen so as to expose all of said sheet of instant film for a predetermined exposure period.

15. The method of claim 11 wherein said step of providing a non-focusing, selectively absorbent optical collimation layer includes the step of attenuating, at said opaque walls, light emanating from said light emitting display screen in non-orthogonal directions, such that light passing through said optical collimation tunnels comprises orthogonal light.

16. The method of claim 11 wherein said plurality of optical collimation tunnels are substantially parallel to one another.

\* \* \* \* \*